United States Patent [19]

Hubred

[11] Patent Number: 4,514,368

[45] Date of Patent: Apr. 30, 1985

[54] LEACHING NICKEL, COBALT, MOLYBDENUM, TUNGSTEN, AND VANADIUM FROM SPENT HYDROPROCESSING CATALYSTS

[75] Inventor: Gale L. Hubred, Richmond, Calif.

[73] Assignee: Chevron Research Company, San Francisco, Calif.

[21] Appl. No.: 422,761

[22] Filed: Sep. 24, 1982

[51] Int. Cl.$^3$ .................. C01G 39/00; C01G 41/00; C01G 31/00; C01G 51/00

[52] U.S. Cl. .............................. 423/54; 75/103; 423/63; 423/68; 423/139; 423/150

[58] Field of Search ............... 252/412; 423/54, 63, 423/68, 139, 150; 502/24, 26; 75/103

[56] References Cited

U.S. PATENT DOCUMENTS

| | | | |
|---|---|---|---|
| 2,204,193 | 6/1940 | Spicer | 252/412 |
| 2,298,091 | 10/1942 | Cooper, Jr. et al. | 423/68 |
| 2,860,967 | 11/1958 | Schlecht et al. | 423/150 |
| 3,168,481 | 2/1965 | Erickson | 252/412 |
| 3,538,017 | 11/1970 | Aglietti | 252/412 |
| 3,567,433 | 3/1971 | Gutnikov | 423/68 |
| 3,933,975 | 1/1976 | Nikolic et al. | 423/150 |
| 4,258,016 | 3/1981 | Siemens et al. | 423/139 |

OTHER PUBLICATIONS

Chemical Abstracts-94-178649x.

Primary Examiner—P. E. Konopka
Attorney, Agent, or Firm—S. R. LaPaglia; V. J. Cavalieri

[57] ABSTRACT

A process for removing nickel, cobalt, molybdenum, and vanadium from spent hydroprocessing catalyst particles by roasting the catalyst at between 400° C. and 600° C. and leaching the catalyst particles with an aqueous solution of ammonia and an ammonium salt.

4 Claims, No Drawings

LEACHING NICKEL, COBALT, MOLYBDENUM, TUNGSTEN, AND VANADIUM FROM SPENT HYDROPROCESSING CATALYSTS

BACKGROUND OF THE INVENTION

This invention relates to methods of leaching metals from solid substrates, particularly methods of leaching metals from spent hydroprocessing catalysts.

One modern development in crude oil processing is the upgrading of metal and sulfur containing feedstocks, e.g., crude oils and residua by hydroprocessing methods. Such upgrading is necessary to convert the heavy feedstock into more valuable, lower boiling fractions and to remove contaminants, particularly metals and sulfur, that can pollute the atmosphere upon combustion.

Crude oils contain various dissolved contaminants, including nickel, vanadium, iron, and sulfur. The lighter fractions are frequently distilled off under atmospheric pressure or a partial vacuum leaving the metals in a high boiling fraction generally called the "residual fraction," or "residua." Residua will generally contain at least 35 ppm metal contaminants, frequently as high as 100 ppm, and in extreme cases, higher than 1000 ppm.

These metals and any sulfur present are removed, thereby upgrading the feedstock, by processing the feedstock, with a catalyst, in the presence of hydrogen. Such catalysts are generally a solid support that contains catalytic metals, generally a Group VI metal alone or in conjunction with a Group VIII metal. The Group VI metal is typically tungsten or molybdenum and the Group VIII metal is typically nickel or cobalt. As the catalyst is used, metals from the feedstock deposit on its exterior surface and the interior surface of its pores, eventually plugging the pores and reducing the activity of the catalyst to such an extent it does not give the desired product quality. Such catalysts are herein defined as "spent catalysts," and contain catalytic metals, an inorganic support matrix, metals removed from the feedstock, sulfur compounds, and a hydrocarbonaceous residuum.

Recently, the obtainable crude oil is tending to be heavier, forcing refiners to use more hydroprocessing catalysts than heretofore necessary to remove metals and sulfur from the feedstock. A shortage of the valuable catalytic metals, particularly cobalt, is therefore possible. In an effort to recycle both the catalytic metals and the catalyst supports, providing a renewable source of catalytic metals, efforts have been made to extract metals from hydroprocessing catalysts, particularly hydrodesulfurization and hydrodemetalation catalysts.

One general method of leaching hydroprocessing catalysts is disclosed in U.S. Pat. No. 3,567,433. An aqueous ammonia and ammonium salt leach solution is contacted with spent catalyst particles. The conditions of the system were not optimized, resulting in low metals recovery.

Another leaching process is disclosed in *Chemical Abstracts*, 94:178649x. A spent catalyst, containing aluminum, vanadium, nickel, cobalt, and molybdenum, was leached with ammonia and ammonium salts, at a temperature greater than 110° C. and an oxygen partial pressure of greater than 1 kg/cm$^2$, for more than ½ hour. Such conditions require autoclave reactors.

Other methods of recovering metals from spent demetalation or desulfurization catalysts are known. U.S. Pat. No. 4,216,118 discloses chlorinating spent catalysts to convert vanadium values to vanadium tetrachloride and nickel values to nickel chloride for recovery by solvent extraction. U.S. Pat. No. 4,145,397 discloses recovery of metals from spent catalysts by roasting at high temperatures and leaching with caustic alkali.

An article in *Engineering and Mining Journal*, May 1978, page 105, describes a plant to process spent catalysts containing no cobalt by first leaching with sodium hydroxide and then with ammonium carbonate.

It would be advantageous if a method were found for leaching, simultaneously, nickel, vanadium, cobalt and tungsten or molybdenum from hydroprocessing catalysts with high yields of each metal value.

SUMMARY OF THE INVENTION

A method is provided for leaching cobalt, nickel, and vanadium and a metal selected from the group consisting of tungsten and molybdenum simultaneously from spent hydroprocessing catalyst particles containing carbonaceous and sulfurous residua. The particles are first roasted in an atmosphere containing molecular oxygen at a temperature in the range of between 400° C. and 600° C. The particles are then leached with an aqueous solution containing ammonia and an ammonium salt. At least 85 percent of the molybdenum, 70 percent of the vanadium, 70 percent of the nickel, and 45 percent of the cobalt on the particle is leached in 15 minutes.

DETAILED DESCRIPTION OF THE PREFERRED EMBODIMENTS OF THE INVENTION

Metals deposited on hydroprocessing catalysts, and in particular the combination of nickel, cobalt, molybdenum and vanadium, or the combination of nickel, cobalt, tungsten and vanadium, can all be removed simultaneously from spent hydroprocessing catalysts by the use of an aqueous leach solution of ammonia and an ammonium salt. Spent hydroprocessing catalysts can be regarded as a high grade ore that contains a distinct metals composition. Leaching is the method of choice for metals removal from this particular ore since the supports are porous and the metals individually are all known to be leachable; however, to simplify downstream separation of the metals and allow maximum recovery of the inorganic support matrix intact, the leaching conditions chosen should not allow iron, a frequent contaminant of oil, or the inorganic support to be leached. In addition, appropriate conditions must be found that allow the simultaneous leaching of all four metals in high yield.

The spent catalyst particles, as they come from the catalytic reaction vessel, are highly contaminated with carbonaceous deposits, also termed "coke," and sulfur. These contaminants are easily removed by combustion in an atmosphere containing molecular oxygen, for example, air, but it has been found that the amount of metals leached from the catalyst particles, particularly nickel, tends to suffer if the catalyst is roasted at too high a temperature. Preferable conditions for reaction with oxygen are at less than 600° C., preferably between 400° C. and 500° C. Temperature can be controlled by diluting the oxygen with nitrogen or by other methods known to the art. The catalyst so treated is free from substantial carbonaceous and sulfurous residue and the metals contained therein can be easily removed by an aqueous ammonia leach. The preferable leach solution is an aqueous solution of $NH_3(aq)$, hereinafter ammonia, and $NH_4^+(aq)$, hereinafter ammonium from a suitable ammonium salt. Such a solution will be alkaline, which is preferred to solubilize vanadium and molybdenum, and will contain free ammonia, an effective complexing agent for nickel and cobalt. Ammonia and ammonium carbonate solutions are especially well suited as they allow reagent recycle by means of distillation of the pregnant liquor and reabsorbtion in fresh or recycle aqueous solution. Ammonium sulfate is another preferred ammonium salt for the practice of this invention. Nickel and cobalt will be free cations and form $M(NH_3)_x^{++}$ where x is 3 to 6, hereinafter ammine complexes, and molybdenum and vanadium will be in the form of anionic oxide ions and will form ammonium salts.

The catalyst support of the spent catalyst particles will frequently be alumina. However, mixtures of alumina with other refractory inorganic oxides, for example, silica, boria, magnesia and titania, as well as supports that contain naturally occurring alumina-containing clays, for example, kaolin or halloysite, may be leached by the process of this invention.

In the buffered system used herein, two factors must be adjusted for optimal extraction: the concentration of ammonia, and the pH of the leach solutions. The solution must contain sufficient ammonia to complex the nickel and cobalt present, and sufficient ammonium to control pH. The pH should be not lower than 9.5, or molybdenum and vanadium recoveries suffer, and not higher than 11, or nickel and cobalt recoveries suffer. A concentration of ammonia $NH_3(aq)$, hereinafter ammonia, plus $NH_4^+(aq)$, hereinafter ammonium, not exceeding 6M and having the ammonia concentration approximately equal to the ammonium concentration meets these requirements. It is preferred that the solution have at least a six-fold molar ratio of ammonia compared to the amount of cobalt ion plus nickel ion calculated to be on the spent catalyst particles. The molar concentration of the ammonium salt should not exceed about 2M, in order to allow sufficient solubility of vanadium. An especially preferred leach system is one where the ammonia concentration is initially substantially equal to the ammonium ion concentration and both species are present in about 2M concentrations.

It has been observed that the length of time of the leach is important for maximum cobalt yield. It has been discovered that the time required for maximum recovery of cobalt varies with the catalyst. To maximize cobalt recovery, cobalt concentration in the pregnant liquor is monitored and the leach stopped when cobalt concentration starts to fall. The temperature of the leach is also important. In general, the higher the leach temperature, the more any particular species will go into solution; but a practical upper limit is the boiling point of the solution at atmospheric pressure, above which a pressure vessel would be required. In practice, a temperature of between about 85° C. and 95° C. is found to be optimal. After 15 minutes at about 85° C., the leach solution will typically contain more than 85 percent of the molybdenum, about 75 percent to 80 percent of the nickel, 75 percent to 85 percent of the vanadium, and at least 45 percent of the cobalt. (These percentages refer to the amount by weight of metal in solution compared to the amount of metal that was on the spent catalyst before leaching). Less than 0.1 percent of the alumina is extracted and less than 5 percent of the iron is extracted.

The exact leach conditions can be tailored to the catalyst which is to be leached. For example, if it is known that the catalyst contains no cobalt, longer leach times may be used. Since catalysts used in desulfurization or demetalation service are frequently loaded with cobalt or nickel and molybdenum or tungsten as catalytic metals, and nickel, vanadium, and iron are the typical contaminants of the feedstock, the time of the leach may be tailored to extract the maximum amount of the hardest to extract metal known to be present.

EXAMPLE 1

A spent hydrodesulfurization catalyst containing 1.45 weight percent cobalt and 6.75 weight percent molybdenum, when weight percent is measured as reduced metal compared to spent catalyst weight, was obtained from pilot plant service. The catalyst particles contained, in addition to the catalytic metals, 1.62 weight percent nickel and 6.24 weight percent vanadium, when weight percent is measured as a percentage of reduced metal to spent catalyst weight, as well as 9.86 weight percent carbonaceous deposits and 12.3 weight percent sulfur.

The catalyst particles were roasted in a bed about 0.75 inches deep at 310° C. for 3 hours, then at 438° C. for 3 hours. The temperature never exceeded 450° C. At the end of the roast, the particles had lost 10.2 percent of their original weight. This weight loss was attributed to oxidation, and subsequent loss to the atmosphere of carbon and sulfur.

A leach solution was prepared by dissolving 179 grams $(NH_4)_2CO_3$ in 1 liter of a 2M aqueous solution of $NH_4OH$. Ninety-eight grams of catalyst particles, roasted as above, were placed in a 5-liter flask heated to 85° C. Aliquots were taken every 5 minutes and analyzed by Inductively Coupled Plasma (ICP) to determine metals content.

Table I shows the results.

TABLE I

| Time (minutes) | Metals Concentration Expressed As % Of Total Metals On Catalyst | | | | | |
|---|---|---|---|---|---|---|
| | [Co] | [Ni] | [Mo] | [V] | [Fe] | [P] |
| 5 | 47 | 73 | 86 | 74 | 3.6 | 15 |
| 10 | 47 | 73 | 86 | 76 | 5.7 | 17 |
| 28 | 44 | 85 | 86 | 84 | 4.2 | 28 |

It can be seen that cobalt concentration peaks at about 5 to 10 minutes and thereafter drops off. The reason for this is not clearly understood, but is believed to be related to readsorbtion onto the inorganic catalyst matrix. Since the other metals do not show marked increases of concentration after 15 minutes, except for phosphorous, it is desirable to stop the leach after about this length of time. Since phosphorous may interfere with downstream processing of the leach liquor and is not a valuable metal to be recovered, stopping the leach when the solution contains low amounts of phosphorous is preferable. Although this example was leached at 85° C., the spent catalysts could have been leached at any temperature between 75° C. and the boiling point of the solution, but preferably between 85° C. and 95° C.

EXAMPLE 2

Spent hydrodesulfurization catalyst containing 1.4 weight percent cobalt, 6.3 weight percent molybdenum, 2.2 weight percent nickel, and 4.2 weight percent vanadium was roasted for 2 hours at 427° C. under a slight flow of air. When substantially all the carbonaceous and sulfurous residue was burned off, the roasting was stopped. When the particles had cooled, they were placed in 1 liter of solution made by dissolving 200 grams of $(NH_4)_2CO_3$ in 1 liter of 2M aqueous $NH_4OH$.

The solution was analyzed for metals after 20 minutes and 180 minutes. The results are shown in Table II.

TABLE II

| Time (minutes) | % Metals Extracted | | | |
|---|---|---|---|---|
| | [Co] | [Ni] | [Mo] | [V] |
| 20 | 48 | 71 | 89 | 68 |
| 180 | 31 | 83 | 97 | 87 |

It can be seen that with a great increase in the length of time of the leach, more nickel, molybdenum and vanadium were recovered, but the yield of cobalt had significantly fallen. Since cobalt is the most valuable of the metals on the catalyst particles, the shorter leach time is indicated.

EXAMPLE 3

Spent hydroprocessing catalyst particles were roasted at various temperatures and then placed in a solution of 1M $(NH_4)_2CO_2$ dissolved in 2M $NH_4OH$ solution, except the run at 850° C. which was placed in 0.5M $(NH_4)_2CO_2$ in 2M $NH_4OH$. Aliquots of solution were removed at 15 minutes and 180 minutes and analyzed by ICP for metals content. The results are tabulated in Table III.

TABLE III

| Metal | Roast Temperature | | | | | | | |
|---|---|---|---|---|---|---|---|---|
| | 427° C. | | 600° C. | | 760° C. | | 850° C. | |
| | 15 min | 180 min | 15 min | 180 min | 15 min | 180 min | 15 min | 180 min |
| | (Metal In Solution As Percent Of Metals On Unleached Catalyst Particles) | | | | | | | |
| Co | 48 | 31 | 46 | 26 | 32 | 34 | 32 | 15 |
| Mo | 89 | 97 | 70 | 74 | 81 | 89 | 52 | 62 |
| Ni | 71 | 83 | 45 | 46 | 19 | 28 | 8 | 21 |
| V | 68 | 87 | 70 | 73 | 103 | 107 | 80 | 81 |

The values given are percent of metals compared to the metals content on unleached catalyst.

Nickel recovery suffers as the roast temperature of the spent catalyst particles is increased beyond 600° C. No metals are significantly better recovered than if the spent catalyst is roasted at 427° C. Cobalt recovery is better after 15 minutes at each roast temperature than after 180 minutes at the same roast temperature.

What is claimed is:

1. A process to extract nickel, vanadium, cobalt and molybdenum from spent hydroprocessing catalyst particles containing carbon residue comprising:
   (a) roasting said catalyst particles in an atmosphere containing molecular oxygen at a temperature in the range of between about 400° C. and 600° C.; and
   (b) contacting said roasted catalyst particles with an aqueous solution of ammonia and a compound selected from the group consisting of ammonium carbonate and ammonium sulfate, said solution being maintained at a temperature in the range of 85° C. to 95° C., wherein said aqueous solution has a pH in the range of 9.5 to 11 and concentrations of ammonia plus ammonium do not exceed 6M, such that at least 85 percent of molybdenum, 70 percent of vanadium, 45 percent cobalt, and 70 percent nickel is recovered from said roasted catalyst particles.

2. The process of claim 1 wherein said aqueous solution contains at least six-fold molar ratio of ammonia compared to the nickel and cobalt on said catalyst particles, and less than 2M concentration of ammonium ion.

3. The process of claim 1 including monitoring the concentration of cobalt leached, thereby leaching the maximum amount of cobalt.

4. The process of claim 1 wherein said spent hydroprocessing catalyst particles are supported on alumina.

* * * * *